(12) United States Patent
Hayasaka et al.

(10) Patent No.: US 11,827,790 B2
(45) Date of Patent: Nov. 28, 2023

(54) POLYMER LATEX AND LAYERED PRODUCT

(71) Applicant: ZEON CORPORATION, Tokyo (JP)

(72) Inventors: Kentaro Hayasaka, Tokyo (JP); Takashi Iga, Tokyo (JP)

(73) Assignee: ZEON CORPORATION, Tokyo (JP)

( * ) Notice: Subject to any disclaimer, the term of this patent is extended or adjusted under 35 U.S.C. 154(b) by 309 days.

(21) Appl. No.: 17/278,689

(22) PCT Filed: Sep. 17, 2019

(86) PCT No.: PCT/JP2019/036332
§ 371 (c)(1),
(2) Date: Mar. 23, 2021

(87) PCT Pub. No.: WO2020/066742
PCT Pub. Date: Apr. 2, 2020

(65) Prior Publication Data
US 2022/0041844 A1    Feb. 10, 2022

(30) Foreign Application Priority Data

Sep. 28, 2018    (JP) ................ 2018-183453

(51) Int. Cl.
| | | |
|---|---|---|
| *C08L 9/04* | (2006.01) | |
| *B32B 25/12* | (2006.01) | |
| *B32B 25/10* | (2006.01) | |
| *C08C 1/15* | (2006.01) | |
| *C08C 1/14* | (2006.01) | |
| *A41D 19/00* | (2006.01) | |
| *B29C 41/20* | (2006.01) | |
| *B29K 7/00* | (2006.01) | |
| *B29L 31/48* | (2006.01) | |

(52) U.S. Cl.
CPC ................ *C08L 9/04* (2013.01); *B32B 25/10* (2013.01); *B32B 25/12* (2013.01); *C08C 1/145* (2013.01); *C08C 1/15* (2013.01); *A41D 19/0006* (2013.01); *B29C 41/20* (2013.01); *B29K 2005/00* (2013.01); *B29K 2007/00* (2013.01); *B29K 2713/00* (2013.01); *B29L 2031/4864* (2013.01); *B32B 2250/02* (2013.01); *B32B 2437/02* (2013.01); *C08L 2201/52* (2013.01)

(58) Field of Classification Search
CPC ........... C08L 9/04; B32B 25/12; B32B 25/10; B29K 2007/00; C08C 1/145; C08C 1/15
See application file for complete search history.

(56) References Cited

U.S. PATENT DOCUMENTS

| | | |
|---|---|---|
| 2005/0031884 A1 | 2/2005 | Koide et al. |
| 2008/0207809 A1 | 8/2008 | Koide |
| 2008/0227892 A1 | 9/2008 | van der Wielen et al. |
| 2008/0227913 A1 | 9/2008 | Koide |
| 2009/0255033 A1 | 10/2009 | Chen et al. |
| 2009/0306254 A1 | 12/2009 | van der Wielen et al. |

FOREIGN PATENT DOCUMENTS

| | | | |
|---|---|---|---|
| CN | 106046432 A | 10/2016 | |
| EP | 0179628 A2 | 4/1986 | |
| GB | 2253401 A * | 9/1992 | ........... C09D 109/04 |
| GB | 2253401 A | 9/1992 | |
| JP | S47-003532 B1 | 1/1972 | |
| JP | S61-101555 A | 5/1986 | |
| JP | 2010-521554 A | 6/2010 | |
| WO | 2002/044262 A1 | 6/2002 | |
| WO | 2008/001764 A1 | 1/2008 | |
| WO | 2018/014029 A1 | 1/2018 | |

OTHER PUBLICATIONS

May 20, 2022 Extended Search Report issued in European Patent Application No. 19867017.6.
Emulsion Latex Handbook_the second impression of the first edition Taiseisha Co., Ltd. Feb. 5, 1982, p. 366-373., Feb. 1982.
Akabane Tetsuya et al., "Production Method and Market Trend of Rubber Gloves" Journal of Japan Rubber Association, vol. 88, No. 9, pp. 369(37)-373(41), 2015.
Nov. 19, 2019 International Search Report issued in International patent Application No. PCT/JP2019/036332.
Mar. 23, 2021 International Preliminary Report on Patentability issued in International Patent Application No. PCT/JP2019/036332.

* cited by examiner

*Primary Examiner* — Robert D Harlan
(74) *Attorney, Agent, or Firm* — Oliff PLC

(57) ABSTRACT

A polymer latex including a polymer and at least one polysaccharide selected from the group consisting of tamarind gum, xanthan gum, cationized xanthan gum, gellan gum, guar gum and cationized guar gum.

4 Claims, 1 Drawing Sheet

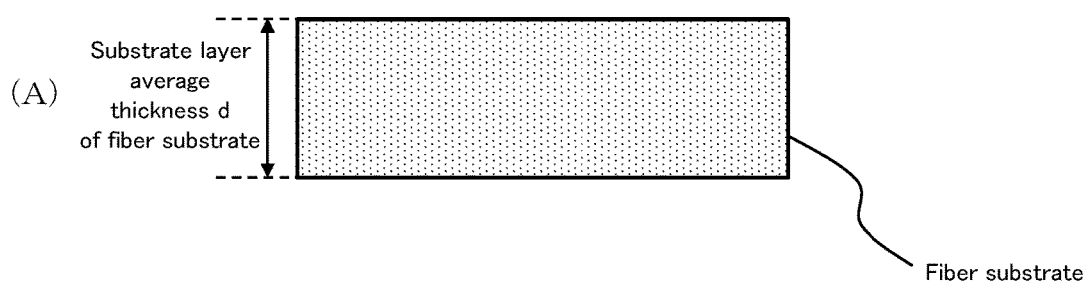
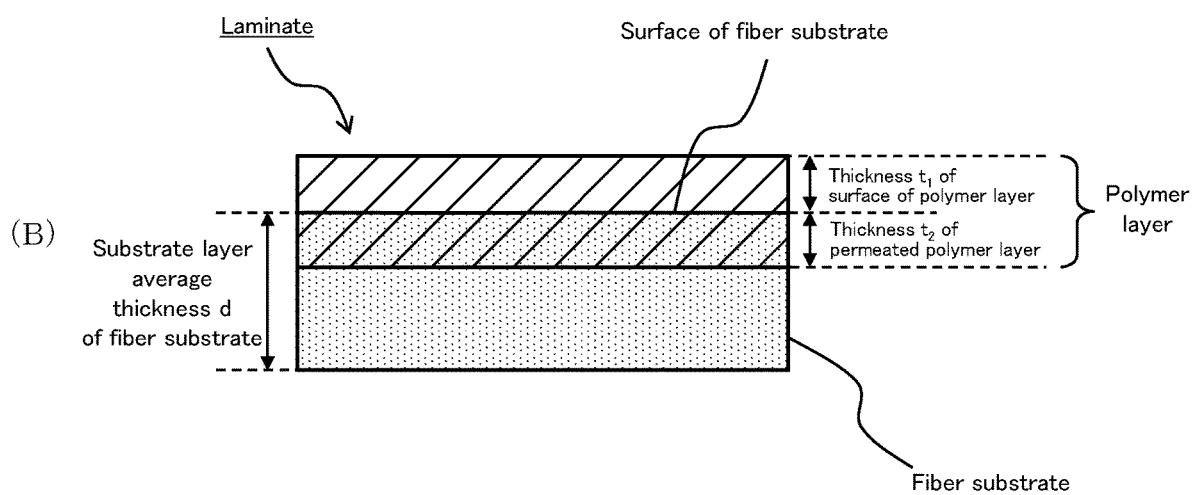

POLYMER LATEX AND LAYERED PRODUCT

TECHNICAL FIELD

The present invention relates to a polymer latex and a laminate. The present invention also relates to a process for producing the above laminate.

BACKGROUND ART

Conventionally, protective gloves whose solvent resistance, grip properties, wear resistance, and the like have been improved by coating fiber gloves with rubber, resin, or the like have been used in various applications, such as manufacturing work in factories, light work, construction work, agricultural work, and the like.

Such protective gloves are required to have excellent flexibility in addition to excellent mechanical strength such as wear resistance and durability as they are typically used in contact with a human body.

For example, Patent Document 1 discloses a method for producing a laminate comprising: a coagulant solution depositing step of depositing a coagulant solution on a fiber substrate; and a coagulating step of contacting the fiber substrate on which the coagulant solution is deposited to a polymer latex to coagulate a polymer, thereby forming a polymer layer on the fiber substrate, wherein as the coagulant solution, a solution obtained by dissolving or dispersing 0.2 to 7.0 wt % of a metal salt as a coagulant and 0.1 to 7.0 wt % of an organic acid in a solvent is used.

RELATED ART

Patent Document

PATENT DOCUMENT 1: WO 2018/014029

SUMMARY OF THE INVENTION

Problem to be Solved by the Invention

According to the method disclosed in Patent Document 1, although a laminate having excellent properties can be obtained, there is room for improving suppression of a crack in the process of forming a polymer layer when forming a relatively thick polymer layer. The crack in a polymer layer of a protective glove may impair comfort during wearing of the protective glove.

The present invention has been made in consideration of such circumstances. The present invention aims to provide a polymer latex that can form a relatively thick polymer layer without using an acid or a salt while avoiding occurrence of a crack and peeling, and in addition, can give a laminate excellent in comfort during wearing, flexibility and wear resistance and having a high protection performance against a solvent, and also has excellent storage stability.

Means for Solving the Problem

The present inventors have found that in the case of forming a relatively thick polymer layer, use of a solution containing a salt or an acid as a coagulant solution is likely to cause the crack in a process of forming a polymer layer. This finding is supposed to be caused by ununiform coagulation that is likely to occur when forming a thick polymer layer with using a coagulant solution containing an acid or a salt. Therefore, the present inventors have intensively studied a means capable of forming a relatively thick polymer layer without using an acid or a salt. Then, the present inventors have found that a relatively thick polymer layer can be formed on a substrate surface without causing the crack or peeling only when a very limited type of polysaccharide is used, and that a laminate thus obtained is excellent in the comfort during wearing, the flexibility and the wear resistance and has the high protection performance against a solvent, and further, even such a polysaccharide is used, the storage stability of a polymer latex is not impaired, thereby completing the present invention.

According to the present invention, a polymer latex comprising a polymer and at least one polysaccharide selected from the group consisting of tamarind gum, xanthan gum, cationized xanthan gum, gellan gum, guar gum, and cationized guar gum is provided.

In the polymer latex according to the present invention, it is preferable that the polymer is nitrile rubber.

According to the present invention, a laminate comprising a substrate and a polymer layer famed with the above mentioned polymer latex is provided.

According to the present invention, a method for producing the above laminate, comprising: an alcohol depositing step of depositing alcohol on the substrate; and an alcohol coagulating step of contacting the substrate on which the alcohol is deposited to the polymer latex to coagulate the polymer thereby forming the polymer layer is provided.

According to the present invention, a method for producing the above laminate, comprising: a heat-sensitive coagulating step of contacting the substrate in a heated state to the polymer latex to coagulate the polymer thereby forming the polymer layer is provided.

Effects of Invention

According to the present invention, the polymer latex that can form a relatively thick polymer layer without using an acid or a salt while avoiding occurrence of the crack and peeling, and in addition, can give a laminate excellent in the comfort during wearing, the flexibility and the wear resistance and having the high protection performance against a solvent, and also has the excellent storage stability can be provided.

BRIEF DESCRIPTION OF DRAWINGS

FIG. 1(A) is a cross-sectional view of a fiber substrate prior to forming a polymer layer. FIG. 1(B) is a cross-sectional view of a laminate famed by laminating a polymer layer on the fiber substrate shown in FIG. 1(A).

DESCRIPTION OF EMBODIMENTS

A polymer latex of the present invention comprises a polymer and at least one polysaccharide selected from the group consisting of tamarind gum, xanthan gum, cationized xanthan gum, gellan gum, guar gum, and cationized guar gum.

A polymer constituting a polymer latex is not particularly limited to, and examples thereof include natural rubber; conjugated diene rubber obtained by polymerizing or copolymerizing conjugated diene such as butadiene or isoprene; and the like. Among these, the conjugated diene rubber is preferable. Examples of the conjugated diene rubber include so-called nitrile rubber obtained by copolymerizing nitrile group-containing monomers, isoprene rubber, styrene-butadiene rubber, chloroprene rubber, and the like. Among these, nitrile rubber is particularly preferable.

The nitrile rubber is not particularly limited to, and a copolymer obtained by copolymerizing an α,β-ethylenically unsaturated nitrile monomer and an additional copolymerizable monomer optionally used can be used.

The α,β-ethylenically unsaturated nitrile monomer is not particularly limited to, and an ethylenically unsaturated compound having a nitrile group and preferably 3 to 18 carbon atoms can be used. Examples of such an α,β-ethylenically unsaturated nitrile monomer include acrylonitrile, methacrylonitrile, halogen-substituted acrylonitriles, and the like. Among these, acrylonitrile is particularly preferable. Note that, these α,β-ethylenically unsaturated nitrile monomers may be used alone or in combinations of two or more.

The content ratio of the α,β-ethylenically unsaturated nitrile monomer unit in the nitrile rubber is preferably 10 to 45% by weight, more preferably 20 to 40% by weight, still more preferably 30 to 40% by weight of the total monomer units. By controlling the content ratio of the α,β-ethylenically unsaturated nitrile monomer unit within the range described above, the obtained laminate can have excellent solvent resistance. In addition, by controlling the content ratio of the α,β-ethylenically unsaturated nitrile monomer unit within the above range, the nitrile rubber gels and coagulates more successfully in the process of forming the polymer layer using the polymer latex containing the nitrile rubber, and the polymer layer is famed more successfully. This can reduce an uncomfortable feel to a hand when the obtained laminate is worn as a protective glove or the like, thus further improving comfort during wearing.

Further, the nitrile rubber preferably contains a conjugated diene monomer unit from the viewpoint of imparting rubber elasticity. The conjugated diene monomer forming the conjugated diene monomer unit is preferably a conjugated diene monomer having 4 to 6 carbon atoms such as 1,3-butadiene, isoprene, 2,3-dimethyl-1,3-butadiene, 1,3-pentadiene, chloroprene, and the like, more preferably 1,3-butadiene and isoprene, particularly preferably 1,3-butadiene. Note that these conjugated diene monomers may be used alone or in combinations of two or more.

The content ratio of the conjugated diene monomer unit is preferably 40 to 80% by weight, more preferably 52 to 78% by weight of the total monomer units constituting the nitrile rubber. By controlling the content ratio of the conjugated diene monomer unit within the range described above, the obtained laminate can have improved flexibility.

Further, the nitrile rubber may include a monomer forming an α,β-ethylenically unsaturated nitrile monomer unit and an additional ethylenically unsaturated acid monomer copolymerizable with the monomer forming the conjugated diene monomer unit.

The additional copolymerizable ethylenically unsaturated acid monomer is not particularly limited to, and examples thereof include carboxyl group-containing ethylenically unsaturated monomers, sulfonic acid group-containing ethylenically unsaturated monomers, phosphoric acid group-containing ethylenically unsaturated monomers, and the like.

The carboxyl group-containing ethylenically unsaturated monomer is not particularly limited to, and examples thereof include ethylenically unsaturated monocarboxylic acids such as acrylic acid, methacrylic acid, and crotonic acid; ethylenically unsaturated polyvalent carboxylic acids and anhydrides thereof, such as fumaric acid, maleic acid, itaconic acid, maleic anhydride, itaconic anhydride; partially esterified products of ethylenically unsaturated polyvalent carboxylic acids, such as methyl maleate and methyl itaconate; and the like.

The sulfonic acid group-containing ethylenically unsaturated monomer is not particularly limited to, and examples thereof include vinylsulfonic acid, methylvinylsulfonic acid, styrenesulfonic acid, (meth)allylsulfonic acid, ethyl (meth) acrylate-2-sulfonate, 2-acrylamide-2-hydroxypropanesulfonic acid, and the like.

The phosphoric acid group-containing ethylenically unsaturated monomer is not particularly limited to, and examples thereof include propyl (meth)acrylate-3-chloro-2-phosphate, ethyl (meth)acrylate-2-phosphate, 3-allyloxy-2-hydroxypropane phosphoric acid, and the like.

These additional copolymerizable ethylenically unsaturated acid monomers may be used as alkali metal salts or ammonium salts, and may be used alone or in combinations of two or more. Among the additional copolymerizable ethylenically unsaturated acid monomers mentioned above, a carboxyl group-containing ethylenically unsaturated monomer is preferable, an ethylenically unsaturated monocarboxylic acid is more preferable, and a methacrylic acid is particularly preferable.

The polymer latex can be obtained by emulsion polymerization of a monomer mixture containing the above-mentioned monomers, for example. In the emulsion polymerization, ordinarily used polymerization additives, such as an emulsifier, a polymerization initiator, a molecular weight adjuster, and the like can be used.

The emulsifier used in the emulsion polymerization is not particularly limited to, and examples thereof include anionic surfactants, nonionic surfactants, cationic surfactants, amphoteric surfactants, and the like. A nonionic surfactant is preferable from the viewpoint of proper progress of the coagulation. As a nonionic surfactant, a water-soluble nonionic polymer having a cloud point of an ordinary temperature or higher and 100° C. or less is preferable. Specific examples of the nonionic surfactant include polyoxyethylene alkyl ethers, polyoxyethylene alkyl phenol ethers, polyoxyethylene alkyl esters, and polyoxyethylene sorbitan alkyl esters, and the like.

The amount of the emulsifier to be used in the emulsion polymerization is preferably 0.5 to 10 parts by weight, more preferably 1 to 8 parts by weight based on 100 parts by weight of the total monomers to be used.

The polymerization initiator is not particularly limited to, but a radical initiator is preferable. The radical initiator is not particularly limited to, and examples thereof include inorganic peroxides such as sodium persulfate, potassium persulfate, ammonium persulfate, potassium peiphosphate, and hydrogen peroxide; organic peroxides such as t-butyl peroxide, cumene hydroperoxide, p-menthane hydroperoxide, di-t-butyl peroxide, t-butyl cumyl peroxide, acetyl peroxide, isobutyryl peroxide, octanoyl peroxide, dibenzoyl peroxide, 3,5,5-trimethylhexanoyl peroxide, and t-butylperoxy isobutyrate; azo compounds such as azobisisobutyronitrile, azobis-2,4-dimethylvaleronitrile, azobiscyclohexanecarbonitrile, and methyl azobisisobutyrate; and the like. Among these, an inorganic peroxide or an organic peroxide is preferable, an inorganic peroxide is more preferable, and a persulfate is particularly preferable. These polymerization initiators may be used alone or in combinations of two or more.

The amount of the polymerization initiator to be used is preferably 0.01 to 2 parts by weight, more preferably 0.05 to 1.5 parts by weight based on 100 parts by weight of the total monomers to be used.

The molecular weight adjuster is not particularly limited to, and examples thereof include α-methyl styrene dimer; mercaptans such as t-dodecyl mercaptan, n-dodecyl mercaptan, and octyl mercaptan; halogenated hydrocarbons such as carbon tetrachloride, methylene chloride, and methylene bromide; sulfur-containing compounds such as tetraethylthiuram disulfide, dipentamethylenethiuram disulfide, and diisopropyl xanthogen disulfide, and the like. Among these, mercaptans are preferable, and t-dodecylmercaptan is more preferable. These molecular weight adjusters may be used alone or in combinations of two or more.

Although the amount of the molecular weight adjuster to be used depends on its type, it is preferably 0.1 to 1.5 parts by weight, more preferably 0.2 to 1.0 parts by weight based on 100 parts by weight of the total monomers to be used.

Emulsion polymerization is usually carried out in water. The amount of the water to be used is preferably 80 to 500 parts by weight, more preferably 100 to 200 parts by weight based on 100 parts by weight of the total monomers to be used.

In the emulsion polymerization, optionally, a polymerization additive other than the above may be further used. Examples of the polymerization additive include chelating agents, dispersants, pH regulators, deoxidizing agents, particle size adjusting agents, and the like. The type and amount to be used of those polymerization additives are not particularly limited.

Examples of the method for adding the monomers include a method for adding the monomers used in the reaction vessel at a time, a method for continuously or intermittently adding the monomers according to the progress of polymerization, a method in which the reaction is carried out up to a specific conversion ratio by adding a part of the monomers and then the remaining monomers are continuously or intermittently added and polymerized, and the like. Any of these methods may be employed. In the case of mixing and adding the monomers continuously or intermittently, the composition of the mixture may be constant or may be changed.

Further, the monomer to be used may be mixed and then added to the reaction vessel, or each monomer may be individually added to the reaction vessel.

A polymerization temperature during emulsion polymerization is not particularly limited to, but is usually 0 to 95° C., preferably 5 to 70° C. Polymerization time is not particularly limited to, but is usually about 5 to 40 hours.

The polymerization terminator is not particularly limited to as long as it is usually used in emulsion polymerization. Specific examples thereof include hydroxyamine compounds such as hydroxylamine, hydroxyamine sulfate, diethylhydroxyamine, and hydroxyamine sulfonic acid and alkali metal salts thereof; sodium dimethyldithiocarbamate; hydroquinone derivatives; catechol derivatives; aromatic hydroxy dithiocarboxylic acids such as hydroxydimethyl benzene thiocarboxylic acid, hydroxydiethyl benzene dithiocarboxylic acid, and hydroxydibutyl benzene dithiocarboxylic acid, and alkali metal salts thereof; and the like.

The amount of the polymerization terminator to be used is not particularly limited, but it is usually 0.05 to 2 parts by weight based on 100 parts by weight of the total monomers to be used.

After stopping the polymerization reaction, if desired, unreacted monomers may be removed, and the solids content and pH may be adjusted.

The weight average particle size of polymer particles constituting the polymer latex is usually 30 to 1000 nm, preferably 50 to 500 nm, more preferably 70 to 200 nm. By controlling the weight average particle size of the polymer particles within the range described above, the viscosity of the polymer latex is controlled to an appropriate level, resulting in further improved handleability of the polymer latex and further improved moldability during molding the polymer layer, whereby a laminate having a more uniform polymer layer is obtained.

In addition to the above polymers, the polymer latex of the present invention comprises at least one polysaccharide selected from the group consisting of tamarind gum, xanthan gum, cationized xanthan gum, gellan gum, guar gum, and cationized guar gum. Since the polymer latex of the present invention comprises such a polysaccharide, a polymer in the polymer latex can be coagulated without using an acid or a salt; and thus, the polymer latex can provide a relatively thick polymer layer without causing the crack and peeling, and also has the sufficient storage stability. As a polysaccharide, at least one selected from the group consisting of tamarind gum and xanthan gum are preferred, and tamarind gum is more preferred, since a laminate having a higher protection performance against a solvent can be obtained.

The tamarind gum can be obtained by separating and purifying an endosperm portion of a legume tamarind seed (*Tamarindus indica* L.). The tamarind gum is a polysaccharide in which D-xylose and D-galactose are bonded as side chains to four D-glucose molecules in the main chain.

The xanthan gum is produced in a fermentation process by a microbe named *Xanthomonas campestris*. A main chain of the xanthan gum is composed of two D-glucose molecules, and a side chain of the same is composed of two D-mannose molecules and one D-glucuronic acid molecule.

The cationized xanthan gum is obtained by cationically modifying xanthan gum, and is preferably one having a cationic charge derived from a quaternary ammonium salt.

The gellan gum is a polysaccharide produced by a microbe named *Sphingomonas elodea* and composed of a tetrasaccharide consisting of D-glucose, D-glucuronic acid, D-glucose, and L-rhamnose, and comprises D-glucuronic acid therein as a carboxylic acid. Although two acyl groups are bonded to one of the glucose residues, one from which a part of the acyl groups is removed may be included.

The guar gum can be obtained by separating and purifying an endosperm portion of a legume guar seed (*Cyamopsis tetragonoloba* L.). The guar gum is a polysaccharide in which one D-galactose molecule constituting a side chain is bonded to two D-mannose molecules of the main chain.

The cationized guar gum is obtained by cationically modifying guar gum, and is preferably one having a cationic charge derived from a quaternary ammonium salt.

The content of the polysaccharide in the polymer latex of the present invention is preferably 0.1 to 10 parts by weight, more preferably 0.1 to 8 parts by weight, and still more preferably 0.1 to 5 parts by weight with respect to 100 parts by weight of the polymer, since the coagulation of the polymer can proceed more smoothly and generation of the crack can be further suppressed. The polysaccharide also has action as a thickener for thickening the polymer latex in addition to exhibiting action of coagulating the polymer latex. Therefore, from the viewpoint of adjusting the viscosity of the polymer latex to an appropriate value, the content of the polysaccharide is preferably within the above range.

The polymer latex disclosed herein preferably further comprises a cross-linking agent.

The cross-linking agent is preferably a sulfur cross-linking agent. The sulfur cross-linking agent is not particularly limited to, and examples thereof include sulfur such as powdered sulfur, sublimed sulfur, precipitated sulfur, colloidal sulfur, surface-treated sulfur, and insoluble sulfur; sulfur-containing compounds such as sulfur chloride, sulfur dichloride, morpholine disulfide, alkylphenol disulfide, dibenzo thiazyl disulfide, caprolactam disulfide, phosphorus-containing polysulfide, and polysulfide polymers; sulfur donating compounds such as tetramethyl thiuram disulfide, selenium dimethyl dithiocarbamate, and 2-(4'-moipholino-dithio)benzothiazole; and the like. These cross-linking agents may be used alone or in combinations of two or more.

The content of the cross-linking agent is preferably 0.01 to 5 parts by weight, more preferably 0.05 to 3 parts by weight, still more preferably 0.1 to 2 parts by weight based on 100 parts by weight of the polymer contained in the polymer latex.

In the case of using a polymer latex in which a cross-linking agent has been added, a polymer latex aged in advance (also referred to as prevulcanized) may be used.

When sulfur is used as the cross-linking agent, it is preferably used together with a cross-linking accelerator (vulcanization accelerator) or zinc oxide.

The cross-linking accelerator (vulcanization accelerator) is not particularly limited to, and examples thereof include dithiocarbamic acids and zinc salts thereof, such as diethyl dithiocarbamic acid, dibutyl dithiocarbamic acid, di-2-ethylhexyl dithiocarbamic acid, dicyclohexyl dithiocarbamic acid, diphenyl dithiocarbamic acid, and dibenzyl dithiocarbamic acid; 2-mercaptobenzothiazole, zinc 2-mercaptobenzothiazole, 2-mercaptothiazoline, dibenzothiazyl disulfide, 2-(2,4-dinitrophenylthio)benzothiazole, 2-(N,N-diethylthiocarbamoylthio)benzothiazole, 2-(2,6-dimethyl-4-morpholinothio)benzothiazole, 2-(4'-morpholino-dithio)benzothiazole, 4-morpholinyl-2-benzothiazyl disulfide, 1,3-bis(2-benzothiazyl-mercaptomethyl) urea, and the like. Among these, zinc diethyl dithiocarbamate, zinc dibutyl dithiocarbamate, 2-mercaptobenzothiazole, and zinc 2-mercaptobenzothiazole are preferable. These cross-linking accelerators may be used alone or in combinations of two or more.

The content of the cross-linking accelerator is preferably 0.1 to 10 parts by weight, more preferably 0.5 to 5 parts by weight, based on 100 parts by weight of the polymer contained in the polymer latex.

The content of the zinc oxide is preferably 5 parts by weight or less, more preferably 0.1 to 3 parts by weight, still more preferably 0.5 to 2 parts by weight, based on 100 parts by weight of the polymer contained in the polymer latex.

The polymer latex of the present invention also preferably comprises a polyol. By comprising a polyol, a further thicker polymer layer can be easily famed without causing a crack. Examples of the polyol include a polyalcohol having 2 to 12 carbon atoms, for example, propylene glycol, glycerin, sorbitol, sucrose, pentaerythritol, sorbitan, and the like.

The content of the polyol is preferably 0.1 to 5 parts by weight, more preferably 0.3 to 2 parts by weight, based on 100 parts by weight of the polymer contained in polymer latex.

In addition, a thickener may be appropriately blended into the polymer latex. The thickener is not particularly limited to, and examples thereof include vinyl compounds such as polyvinyl alcohol and polyvinyl pyrrolidone; cellulose derivatives such as hydroxyethyl cellulose and hydroxypropyl cellulose; polycarboxylic acid compounds and sodium salts thereof; polyoxyethylene derivatives such as polyethylene glycol ethers; and the like.

The solid content concentration of the polymer latex is usually 20 to 65 wt %, preferably 30 to 60 wt %, more preferably 35 to 55 wt %. By controlling the solid content concentration of the polymer latex within the range described above, the transport efficiency of the latex can be improved, and the viscosity of the polymer latex is controlled to an appropriate level, resulting in improved handleability of the polymer latex.

The pH of the polymer latex is usually 5 to 13, preferably 7 to 10, more preferably 7.5 to 9. By controlling the pH of the polymer latex within the range described above, the mechanical stability is improved, suppressing the occurrence of coarse aggregates during transfer of the polymer latex, and the viscosity of the polymer latex is controlled to an appropriate level, resulting in improved handleability of polymer latex.

The viscosity of the polymer latex at 25° C. is usually 2,000 to 100,000 mPa·s, preferably 2,500 to 50,000 mPa·s, more preferably 3,000 to 20,000 mPa·s, still more preferably 4,000 to 20,000 mPa·s, and particularly preferably 5,000 to 20,000 mPa·s. The viscosity of the polymer latex at 25° C. can be measured, for example, by using a B-type viscometer at 25° C. under the condition of a rotational speed of 6 rpm. In addition, the viscosity of the polymer latex at 25° C. can be adjusted, for example, by a method for adjusting a polymer concentration in the polymer latex, a method for adding a compound having a thickening action to the polymer latex, and the like.

Fillers such as carbon black, silica, calcium carbonate, aluminum silicate, magnesium silicate, calcium silicate, magnesium oxide, zinc (meth)acrylate, and magnesium (meth)acrylate may be added to the polymer latex. Further, various additives such as an anti-aging agent, an antioxidant, a preservative, an antimicrobial agent, a wetting agent, a dispersant, a pigment, a dye, a reinforcing agent, a pH-adjusting agent, and the like may be added to the polymer latex in a predetermined amount, as required.

The laminate of the present invention comprises a substrate and a polymer layer famed with the above polymer latex. The laminate of the present invention can be used in an application in which the flexibility is required. The application is not particularly limited to, but for example, the laminate is preferably used as a laminate comprising a fiber substrate used as the substrate and the polymer layer, and particularly preferably used in contact with a human body, for example, as a protective glove such as for work, household, agricultural, fishery, industrial use, and the like.

The fiber substrate is not particularly limited to, as long as it is made of fiber, and natural fibers such as cotton, hair, hemp, and wool, synthetic fibers such as polyester, polyurethane, acrylic, and nylon, and the like can be used as a raw material. Among these, nylon is preferably used. Further, the fiber substrate may be a knitted or sewn substrate, or may be a woven or non-woven fabric.

The thickness of the fiber substrate (the substrate layer average thickness d of the fiber substrate described later) is not particularly limited to, but preferably 0.01 to 3.00 mm, more preferably 0.02 to 2.00 mm, still more preferably 0.03 to 1.5 mm. The linear density of the fiber substrate is not particularly limited to, but preferably 50 to 500 deniers. The gauge number of the fiber substrate is not particularly limited to, but preferably 7 to 18 gauge. The gauge number refers to the number of needles in the knitting machine per inch.

As shown in FIG. 1(B), the laminate of the present invention preferably has a constitution in which a part of the polymer layer is famed on the surface of the fiber substrate, and the remaining part of the polymer layer permeates into a gap between fibers constituting the fiber substrate. FIG. 1(A) is a cross-sectional view of a fiber substrate prior to forming a polymer layer, and FIG. 1(B) is a cross-sectional view of a laminate famed by laminating a polymer layer on the fiber substrate shown in FIG. 1(A). FIG. 1(B) shows an example that the polymer layer is famed to cover the fiber substrate in a state in which a part of the polymer layer has permeated among the fibers constituting the fiber substrate. Then, in FIG. 1(B), in the polymer layer constituting the laminate, the portion permeated from the surface of the fiber substrate into the gaps among the fibers is referred to as a permeated polymer layer, and in the polymer layer, the portion covering the fiber substrate from the surface of the fiber substrate is referred to as a surface polymer layer. Note that, in the present invention, the polymer layer is described as being composed of a permeated polymer layer and a surface polymer layer as appropriate, but in general, the permeated polymer layer and the surface polymer layer are formed as one body. In the following, an explanation will be made by referring to FIG. 1(A) and FIG. 1(B) as appropriate.

The thickness of the polymer layer formed on the substrate of the laminate of the present invention from the surface of the substrate (the thickness $t_1$ of the surface polymer layer shown in FIG. 1(B)) is preferably 80 μm or more, more preferably 100 μm or more, and still more preferably 180 μm or more. From the viewpoint of more appropriately enhancing the protection performance against a solvent, the thickness $t_1$ from the surface of the substrate is particularly preferably 200 μm or more, and most preferably 400 μm or more. By controlling the thickness $t_1$ of the surface polymer layer within the above range, durability when the obtained laminate is used as a protective glove is further enhanced. The upper limit of the thickness $t_1$ of the surface polymer layer is not particularly limited to, but is preferably 5000 μm or less, more preferably 3000 μm or less, and still more preferably 2000 μm or less.

In the laminate obtained by the production method of the present invention, the thickness of the portion of the polymer layer famed on the substrate that has permeated into the interior of the substrate (the thickness $t_2$ of the permeated polymer layer shown in FIG. 1(B)) is preferably 1 μm or more, more preferably 5 μm or more, still preferably 10 μm or more. By controlling the thickness of the portion that has permeated into the interior of the substrate (the thickness $t_2$ of the permeated polymer layer shown in FIG. 1(B)) within the range described above, the formation of the portion that has permeated into the interior of the substrate (the permeated polymer layer shown in FIG. 1(B)) can be more effective, i.e., the wear resistance and the protection performance against a solvent can be further enhanced. The upper limit of the thickness of the portion of the polymer layer famed on the substrate that has permeated into the interior of the substrate (the thickness $t_2$ of the permeated polymer layer shown in FIG. 1(B)) is not particularly limited to, but from the viewpoint of avoiding pass through, that is, the polymer layer reaching the back side of the substrate, the thickness $t_2$ is preferably less than the thickness of the substrate (the substrate layer average thickness d of the fiber substrate shown in FIG. 1(B)), and from the viewpoint of the flexibility, more preferably less than or equal to 3,000 μm, and still more preferably less than or equal to 2,000 μm. Note that when the pass through, that is, the polymer layer reaches the other surface of the substrate occurs, the comfort during wearing can become inferior, or the productivity of the laminate can decline (for example, the productivity declines because when the polymer layer is famed by depositing the polymer latex on the substrate in a state in which the substrate covers a predetermined mold, the polymer latex may deposit on the mold due to pass through, which makes it difficult to remove the obtained laminate from the mold).

The thickness of the entire polymer layer, that is, the total of the thickness $t_2$ of the permeated polymer layer and the thickness $t_1$ of the surface polymer layer is not particularly limited to, but is preferably 150 μm or more, more preferably 400 μm or more, and still more preferably 650 μm or more.

A ratio ($t_2/t_1$) of the thickness of the portion of the polymer layer famed on the substrate that has permeated into the interior of the substrate (the thickness $t_2$ of the permeated polymer layer shown in FIG. 1(B)) with respect to the thickness of the polymer layer famed on the substrate from the surface of the substrate (the thickness $t_1$ of the surface polymer layer shown in FIG. 1(B)) is preferably 0.001 to 15, more preferably 0.005 to 10, and still more preferably 0.01 to 5, from the viewpoint of highly balancing the comfort during wearing, the flexibility, and the wear resistance.

In addition, from the viewpoint of highly balancing the comfort during wearing, the flexibility, and the wear resistance of the laminate obtained by the production method of the present invention, a ratio ($t_1/d$) of the thickness of the polymer layer foiled on the substrate from the surface of the substrate (the thickness $t_1$ of the surface polymer layer shown in FIG. 1(B)) with respect to the thickness of the substrate (the substrate layer average thickness d of the fiber substrate shown in FIG. 1(B)) is preferably 0.1 to 300, more preferably 0.15 to 30, and still more preferably 0.2 to 15. The total thickness of the laminate (the total of the thickness $t_1$ of the surface polymer layer and the thickness of the substrate layer average thickness d of the fiber substrate shown in FIG. 1(B)) is preferably 0.2 to 8 mm, more preferably 0.2 to 4.5 mm. Note that, in a microstructure, the fiber substrate may differ in thickness between a portion at which the degree of overlap of the fibers becomes dense and a portion at which the degree of overlap of the fibers becomes sparse, and the substrate layer average thickness d of the fiber substrate shown in FIG. 1(B) is determined as an average value obtained by taking the thickness of the portion at which the degree of overlap of the fibers becomes dense as its thickness. Further, although each of the fibers constituting the fiber substrate has a diameter, a plane including an apex of a diameter of each of the fibers on the surface polymer layer side is defined as a surface of a substrate.

The laminate of the present invention can be produced, for example, by a method for contacting a substrate on which alcohol is deposited with a polymer latex and coagulating the polymer latex in contact therewith by the action of the alcohol (an alcohol coagulating process), a method for contacting a substrate in a heated state with a polymer latex and coagulating the polymer latex in contact therewith by the heat of the substrate (a heat-sensitive coagulating process), and the like.

First, the alcohol coagulating process with using the fiber substrate as a substrate will be described. A process for producing a laminate with the alcohol coagulating process preferably comprises: an alcohol depositing step of depositing alcohol on the substrate; and an alcohol coagulating step of contacting the substrate on which the alcohol is deposited to the polymer latex to coagulate the polymer thereby forming the polymer layer.

The alcohol is not particularly limited to as long as it can coagulate a polymer in the polymer latex, and examples thereof include alcohols having 1 to 10 carbon atoms such as methanol, ethanol, propanol, and butanol.

In the alcohol depositing step, for example, other components such as water may be used in addition to the alcohol, but it is preferable that an acid or a salt known as a coagulant is not used. Examples of the acid that is not preferably used include organic acids such as acetic acid, formic acid, propionic acid, citric acid, and oxalic acid. Further, examples of the salt that is not preferably used include metallic salts of acids such as nitric acid, sulfuric acid, acetic acid, and hydrochloric acid. Specific examples of these metallic salts include nitrates such as calcium nitrate, barium nitrate, and zinc nitrate; metallic halides such as barium chloride, calcium chloride, magnesium chloride, zinc chloride, and aluminum chloride; acetates such as barium acetate, calcium acetate, and zinc acetate; sulfates such as calcium sulfate, magnesium sulfate, and aluminum sulfate; and the like.

The method for depositing the alcohol to the substrate is not particularly limited to, and examples thereof include a method for dipping the substrate (fiber substrate) into the alcohol.

When the fiber substrate is dipped into the alcohol, the time for dipping is not particularly limited to, but is preferably 30 to 1 seconds, more preferably 10 to 1 seconds.

When the alcohol is deposited on the fiber substrate, it is preferable that the fiber substrate is dipped into the alcohol in a state in which a mold for dipping having a desired shape is covered with the fiber substrate.

The mold for dipping covered with the fiber substrate is not particularly limited to, and various molds made of a material such as ceramics, glass, metal, plastic, and the like may be used. The shape of the mold for dipping can be a desired shape that matches the shape of the final product. For example, in the case in which the laminate is used as a protective glove, the mold for dipping that the fiber substrate covers is preferably a mold for dipping corresponding to each type of glove such as a mold having a shape of a wrist to finger tips, and the like.

The substrate may be heated in advance (also referred to as preheated), and then the fiber substrate supported on the mold for dipping in a heated state may be contacted with alcohol. The temperature of the substrate when the substrate contacts the alcohol (also referred to as preheat temperature) is preferably 30 to 100° C., more preferably 40 to 95° C., still more preferably 45 to 90° C., particularly preferably 50 to 90° C., most preferably 55 to 90° C.

In the alcohol depositing step, a polymer layer can be famed by depositing an alcohol on a fiber substrate and then contacting the fiber substrate on which the alcohol is deposited with a polymer latex to coagulate the polymer. At this time, while a part of the polymer latex permeates between the fibers constituting the fiber substrate, the polymer in the polymer latex coagulates, thereby forming the polymer layer on the fiber substrate, so that a laminate is obtained. Therefore, as shown in FIG. 1(A) and FIG. 1(B), the obtained laminate becomes a laminate in which a part of the polymer layer permeates into the gap between the fibers constituting the fiber substrate while the polymer layer is famed on the surface of the fiber substrate.

A method for contacting a fiber substrate on which an alcohol is deposited with a polymer latex is not particularly limited to, and examples thereof include a method for dipping a fiber substrate on which an alcohol is deposited into an polymer latex.

In addition, when a fiber substrate on which an alcohol is deposited is dipped in a polymer latex, it is preferable that the fiber substrate on which the alcohol is deposited is dipped into the polymer latex in a state in which a mold for dipping having a desired shape is covered with the fiber substrate. In this case, it is preferable that the alcohol is deposited on the fiber substrate as described above in the state in which the mold for dipping having the desired shape is covered with the the fiber substrate in advance, and then the fiber substrate on which the alcohol is deposited is dipped into the polymer latex while covering the mold for dipping.

In addition, in the production method of the present invention, it is preferable that the fiber substrate on which the alcohol is deposited is dried after being dipped into the polymer latex. The drying temperature is not particularly limited to, but is preferably 10 to 80° C., more preferably 15 to 80° C. The drying time is not particularly limited to, but is preferably from 120 minutes to 5 seconds, more preferably from 60 minutes to 10 seconds.

Next, the heat-sensitive coagulating process using a fiber substrate as a substrate will be described. A method for producing a laminate with the heat-sensitive coagulating process preferably comprises a heat-sensitive coagulating step of contacting the substrate in a heated state to the polymer latex to coagulate the polymer thereby forming the polymer layer.

In the method for producing the laminate with the heat-sensitive coagulating process, by contacting the substrate in a heated state with the polymer latex, the polymer latex is deposited on the surface of the substrate. Since the polymer latex deposit on the surface of the substrate is in contact with the heated substrate, gelling and coagulation of the polymer latex deposited on the surface of the substrate proceeds to thereby be able to form the polymer layer. At this time, while a part of the polymer latex permeates between the fibers constituting the fiber substrate, the polymer in the polymer latex coagulates, thereby forming the polymer layer on the fiber substrate, so that a laminate is obtained. Therefore, as shown in FIG. 1(A) and FIG. 1(B), the obtained laminate becomes a laminate in which a part of the polymer layer permeates into the gap between the fibers constituting the fiber substrate while the polymer layer is famed on the surface of the fiber substrate.

A method for contacting a substrate with a polymer latex is not particularly limited to, and examples thereof include a method for dipping a substrate into a polymer latex. When the substrate is dipped in the polymer latex, the substrate in a heated state may be dipped in the polymer latex in a state in which the substrate is supported on a mold for dipping having a desired shape, for example, by attaching the substrate to the mold. At this time, the mold in addition to the substrate may be heated.

The mold for dipping used in the heat-sensitive coagulating process is not particularly limited to, and examples thereof include those exemplified as the mold for dipping used in the alcohol coagulating process.

In the process in which the substrate is contacted with the polymer latex, the substrate is heated in advance (also referred to as preheated), and then the fiber substrate supported on the mold for dipping in a heated state is contacted with the polymer latex. The temperature of the substrate when the substrate contacts the polymer latex (also referred to as preheat temperature) is preferably 30 to 100° C., more preferably 40 to 95° C., still more preferably 45 to 90° C., particularly preferably 50 to 90° C., most preferably 55 to 90° C. By controlling the preheat temperature of the substrate within the range described above, the temperature of the substrate immediately before the contact with the polymer latex can be controlled in preferable ranges below. The temperature of the substrate immediately before the substrate contacts the polymer latex is preferably 25 to 100° C., more preferably 35 to 95° C., still more preferably 40 to 90°

C., particularly preferably 45 to 90° C., most preferably 50 to 90° C. By controlling the temperature of the substrate within the range described above, in the case in which the polymer layer is famed using the polymer latex by the heat-sensitive coagulating process, the polymer layer can be famed more properly.

Further, the polymer latex deposit on the substrate is preferably dried after the contact of the substrate with the polymer latex. A drying temperature in this process is not particularly limited to, but is preferably 10 to 80° C., more preferably 15 to 80° C. Further, drying time in this process is not particularly limited to, but is preferably 5 seconds to 120 minutes, more preferably 10 seconds to 60 minutes.

In the method for producing the laminate described above, in any of the production methods of the alcohol coagulating process and the heat-sensitive coagulating process, when a polymer latex to which a cross-linking agent is added is used, it is preferable to cross-link the polymer constituting the polymer latex by heating the polymer latex deposited on the fiber substrate.

The heating temperature for cross-linking is preferably 60 to 160° C., more preferably 80 to 150° C., and still more preferably from 90 to 150° C. By controlling the heating temperature within the above range, it is possible to shorten the time required for the cross-linking reaction to improve the productivity of the laminate and to suppress the oxidative deterioration of the polymer due to excessive heating, thereby improving the properties of the obtained laminate. The heating time for cross-linking may be appropriately selected depending on the heating temperature, but is usually 5 to 120 minutes.

Further, it is also possible to remove water-soluble impurities (an emulsifier, a polysaccharide, and the like) from the polymer layer by immersing the polymer layer in hot water at 20 to 80° C. for about 0.5 to 60 minutes after forming the polymer layer on the fiber substrate. When a polymer latex to which a cross-linking agent is added is used, a process to dip such a polymer layer in hot water may be performed after cross-linking the polymer of the polymer layer, but is preferably performed prior to cross-linking the polymer of the polymer layer from the viewpoint of more efficiently removing the water-soluble impurities.

In addition, when the polymer layer is famed in a state in which the fiber substrate covers the mold for dipping, a laminate can be obtained by removing the fiber substrate having a polymer layer famed thereon from the mold for dipping. As the method for removing the laminate from the mold for dipping, a method for peeling from the mold for dipping by hand and a method for peeling by water pressure or pressure of compressed air can be employed.

After removing the laminate from the mold for dipping, a heat treatment (post-cross-linking step) may be performed for 10 to 120 minutes at a temperature of 60 to 120° C. Further, a surface treatment layer may be famed on the inner and/or outer surface of the laminate by a chlorination treatment, a coating treatment, and the like.

Since the laminate thus obtained is produced without using an acid or a salt as a coagulant, even when the polymer layer is thick, the polymer layer does not have a crack, and the substrate and the polymer layer are firmly adhered to each other, and moreover, the comfort during wearing, the flexibility and the wear resistance are excellent and the protection performance against a solvent is high.

EXAMPLE

Hereinafter, the present invention will be described specifically by way of Examples, but the present invention is not limited to these Examples. In the following, unless stated otherwise, the tam "part(s)" is based on weight. The test or evaluation methods of the physical properties and characteristics are as follows.

Viscosity of Latex Composition for Dip-Molding

The viscosity of the latex composition was measured using a B-type viscometer at a temperature of 25° C. The viscosity up to 20,000 mPa·s was measured using a rotor M3 under the condition of a rotational speed of 6 rpm. The viscosity of the latex composition of 20,000 mPa·s or more was measured using a rotor M4 under the condition of a rotational speed of 6 rpm.

Storage Stability of Latex Composition for Dip-Molding

A latex composition for dip-molding was stored at 30 to 40° C. to visually observe occurrence of coagulation of a polymer. The time was recorded when a coagulate was observed within 24 hours after the preparation.

Thickness $t_1$ of Surface Polymer Layer and Thickness $t_2$ of Permeated Polymer Layer For the protective glove (laminate), the thickness $t_1$ of the surface polymer layer and the thickness $t_2$ of the permeated polymer layer were measured by observing a cross-section of the polymer layer of a 12 cm palm portion from the tip of the middle finger using an optical microscope (product name "VHX-200", manufactured by Keyence Corporation). Describing a specific measurement method with reference to FIG. 1, the thickness $t_1$ of the surface polymer layer was determined by measuring the distance from the surface of the fiber substrate to the surface of the polymer layer at ten sites, and calculating the number average value of the measurement results. The thickness $t_2$ of the permeated polymer layer was determined by measuring the distance from the surface of the fiber substrate to the deepest portion of the permeated rubber at ten sites, and calculating the number average value of the measurement results.

Crack in Surface Polymer Layer

The surface polymer layer of the protective glove (laminate) was visually observed and evaluated for a crack.

Peeling at Interface of Surface Polymer Layer

For the protective glove (laminate), peeling of the surface polymer layer was evaluated by visually observing a cross-section of the polymer layer of a 12 cm palm portion from the tip of the middle finger.

Pass Through

The protective glove (laminate) was evaluated for pass through by visually observing whether at least a part of the polymer layer that permeated from one surface of the fiber substrate completely passed through the fiber substrate and reached the other surface.

Comfort During Wearing

Comfort during wearing was evaluated by conducting a survey on how much fatigue was felt in the hands after simple work such as cleaning, carrying, and the like wearing the gloves on the hands. The survey was conducted for ten people. The number of the people who felt fatigue during wearing was totalized and the degree of the fatigue during wearing was evaluated using the criteria below.

Good: Less than three people felt fatigue.
Fair: Three or more and less than six people felt fatigue.
Poor: Six or more people felt fatigue.

Flexibility

The protective glove (laminate) was worn by each of ten people and the flexibility of the glove was evaluated by them according to the following three evaluation scores. The average value of the evaluation scores for each Example was determined. The evaluation score that was closest to the average value was defined as the evaluation score for each Example. For example, when the average value was 2.8, the evaluation score was "3: Soft", and the like.
- 3: Soft
- 2: Slightly Hard
- 1: Hard Wear Resistance A wear test was conducted and the evaluation was performed using Martindale abrasion tester (product name: "STM 633", manufactured by SATRA Technology) in accordance with a method described in EN 388. Specifically, the protective glove (laminate) was repeatedly rubbed while a predetermined weight was applied thereto. The number of times of rubbing before breakage of the glove was obtained. According to the number of times of rubbing before breakage of the glove, each glove was classified into either one of LEVEL 0 to LEVEL 4. The higher the level, the better the wear resistance.
- LEVEL 4: The number of rotations is 8,000 or more rotations.
- LEVEL 3: The number of rotations is 2,000 or more and less than 8,000 rotations.
- LEVEL 2: The number of rotations is 500 or more and less than 2,000 rotations.
- LEVEL 1: The number of rotations is 100 or more and less than 500 rotations.
- LEVEL 0: The number of rotations is less than 100 rotations.

Methanol Permeation Resistance

A methanol permeation test was conducted in accordance with a method described in EN 374-3. In the test, the surface polymer layer forming surface of the protective glove (laminate) is in contact with methanol. The results were classified into LEVEL 0 to LEVEL 4. The higher level indicates better protection performance against the solvent since the higher the level, the better the methanol permeation resistance.
- LEVEL 4: The permeation time is 120 minutes or more.
- LEVEL 3: The permeation time is 60 or more and less than 120 minutes.
- LEVEL 2: The permeation time is 30 or more and less than 60 minutes.
- LEVEL 1: The permeation time is 10 or more and less than 30 minutes.
- LEVEL 0: The permeation time is less than 10 minutes.

Example 1

Preparation of Latex Composition for Dip-Molding

To a latex of nitrile rubber (product name "Nipol LX551A", manufactured by Zeon Corporation) having a content ratio of an acrylonitrile unit of 35 wt %, 1.00 part of tamarind gum (product name "GLYLOID 6C", manufactured by DSP GOKYO FOOD & CHEMICAL Co., Ltd.), 0.01 parts of anti-forming agent (product name "SM 5512", manufactured by Dow Corning Toray Co., Ltd.), 1.00 part of colloidal sulfur (manufactured by Hosoi Chemical Industry Co., Ltd.), 0.50 parts of zinc dibutyldithiocarbamate (manufactured by Ouchi Shinko Chemical Industrial Co., Ltd.), 1.50 parts of zinc oxide, and 3.00 parts of titanium oxide are added in the state of aqueous dispersions of the compounding agents, based on 100 parts of nitrile rubber in the latex of nitrile rubber in tams of solid content. Note that, during the addition of the aqueous dispersion of the compounding agents, a predetermined amount of the aqueous dispersion of the compounding agents was slowly added while stirring the latex. Thereafter, a solid content concentration of the polymer latex was adjusted to 45 wt %. For the obtained latex composition for dip-molding, the measurement of the viscosity and the evaluation of the storage stability were pertained. The results are shown in Table 1.

Production of Protective Glove (Laminate)

The latex composition for dip-molding obtained above was subjected to aging (also referred to as prevulcanizing) at a temperature of 30 to 40° C. for 48 hours.

A glove-shaped fiber substrate (material: nylon, substrate layer average thickness d of fiber substrate: 0.70 mm, 13 gauge) covering a metal glove mold was dipped in methanol for 5 seconds in a heated state at 67° C., and pulled up from methanol. Next, the fiber substrate on which methanol was deposited was dipped in the above latex composition for dip-molding for 5 seconds, and pulled up from the latex composition for dip-molding. Note that the temperature of the fiber substrate immediately before dipping was 27° C. Then, the latex composition for dip-molding deposited on the fiber substrate was dried at 70° C. for 60 minutes to thereby form a polymer layer. Next, the nitrile rubber in the polymer layer was cross-linked by performing a heat treatment at 100° C. for 60 minutes to form a polymer layer. The fiber substrate having the polymer layer famed thereon was then peeled from the metal glove mold to obtain a protective glove (laminate). For the obtained protective glove (laminate), each evaluation was performed in accordance with the methods described above. The results are shown in Table 1.

Example 2

A latex composition for dip-molding and a protective glove (laminate) were obtained in the same manner as in Example 1, except that 0.50 parts of glycerin was further used. The results obtained by the evaluation pertained in the same manner as in Example 1 are shown in Table 1.

Example 3

A latex composition for dip-molding and a protective glove (laminate) were obtained in the same manner as in Example 1, except that xanthan gum (product name "Rhaball Gum GS-C", manufactured by DSP GOKYO FOOD & CHEMICAL Co., Ltd.) was used in place of the tamarind gum. The results obtained by the evaluation performed in the same manner as in Example 1 are shown in Table 1.

Comparative Example 1

Preparation of Latex Composition for Dip-Molding

A latex composition for dip-molding was obtained in the same manner as in Example 1, except that 2.50 parts of polyoxyethylene alkyl ether (product name "EMULGEN 709", nonionic surfactant, cloud point 56° C., manufactured by Kao Corporation) as an emulsifier and 0.50 parts of polyether-modified silicone oil (product name "TPA 4380", manufactured by Toshiba Silicone Co., Ltd.) as a heat-sensitive coagulant were used in place of 1.00 part of the tamarind gum. For the obtained latex composition for dip-molding, the measurement of the viscosity and the evaluation of the storage stability were performed. The results are shown in Table 1.

Production of Protective Glove (Laminate)

The latex composition for dip-molding obtained above was subjected to aging (also referred to as prevulcanizing) at a temperature of 30° C. for 48 hours.

The obtained latex composition for dip-molding was used to form a polymer layer on a glove-shaped fiber substrate (the same as that used in Example 1) that covered a metal glove mold by the heat-sensitive coagulating process. Specifically, after preheated at 67° C., the fiber substrate covering the metal glove mold was dipped in the above latex composition for dip-molding for 2 seconds, and pulled up from the latex composition for dip-molding. Note that the temperature of the fiber substrate immediately before dipping was 66° C. Then, the latex composition for dip-molding deposited on the fiber substrate was dried at 80° C. for 30 minutes to thereby form a polymer layer. Next, the nitrile rubber in the polymer layer was cross-linked by performing a heat treatment at 100° C. for 60 minutes to form a polymer layer. The fiber substrate having the polymer layer famed thereon was then peeled from the metal glove mold to obtain a protective glove (laminate). The obtained protective glove (laminate) was evaluated in the same manner as in Example 1. The results are shown in Table 1.

Comparative Example 2

Preparation of Latex Composition for Dip-Molding

A latex composition for dip-molding was obtained in the same manner as in Example 1, except that 0.40 parts of carboxymethyl cellulose (product name "DAICEL 2200", manufactured by Daicel Fine Chem Ltd.) was used in place of 1.00 part of the tamarind gum. For the obtained latex composition for dip-molding, the measurement of the viscosity and the evaluation of the storage stability were performed. The results are shown in Table 1.

Production of Protective Glove (Laminate)

The latex composition for dip-molding obtained above was subjected to aging (also referred to as prevulcanizing) at a temperature of 30 to 40° C. for 48 hours.

A glove-shaped fiber substrate covering a metal glove mold (the same as that used in Example 1) was dipped in a methanol solution of calcium nitrate as a coagulant solution (calcium nitrate concentration: 2.0 wt %) for 5 seconds in a heated state at 67° C., and pulled up from the coagulant solution, and then dried at a temperature of 30° C. for one minute. The fiber substrate after drying was dipped in the above latex composition for dip-molding for 5 seconds, and pulled up from the latex composition for dip-molding. Note that, the temperature of the fiber substrate immediately before dipping was 27° C. Then, the latex composition for dip-molding deposited on the fiber substrate was dried at 80° C. for 30 minutes to thereby form a polymer layer. Next, the nitrile rubber in the polymer layer was cross-linked by performing a heat treatment at 100° C. for 60 minutes to form a polymer layer. The fiber substrate having the polymer layer famed thereon was then peeled from the metal glove mold to obtain a protective glove (laminate). The obtained protective glove (laminate) was evaluated in the same manner as in Example 1. The results are shown in Table 1.

Comparative Example 3

The coagulant solution was changed from the methanol solution of calcium nitrate to methanol, and after pulling up from methanol, a fiber substrate was dried at a temperature of 30° C. for one minute. Thereafter, the fiber substrate was dipped in the latex composition for dip-molding. Except for these, a protective glove (laminate) was obtained in the same manner as in Comparative Example 2. The obtained protective glove (laminate) was evaluated in the same manner as in Example 1. The results are shown in Table 1.

TABLE 1

| | | Example | | | Comparative Example | | |
|---|---|---|---|---|---|---|---|
| | | 1 | 2 | 3 | 1 | 2 | 3 |
| Formulation of latex composition | | | | | | | |
| Nitrile rubber (acrylonitrile unit: 35 wt %) | (parts) | 100 | 100 | 100 | 100 | 100 | 100 |
| Tamarind gum | (parts) | 1.00 | 1.00 | | | | |
| Xanthan gum | (parts) | | | 1.00 | | | |
| Polyether-modified silicone oil | (parts) | | | | 0.50 | | |
| Carboxymethyl cellulose | (parts) | | | | | 0.40 | 0.40 |
| Glycerin | (parts) | | | 0.50 | | | |
| Viscosity of latex composition | (mPa · s) | 6,000 | 6,000 | 6,000 | 6,000 | 6,000 | 6,000 |
| Storage stability of latex composition (30 to 40° C.) | | Stable for 24 hours or more | Stable for 24 hours or more | Stable for 24 hours or more | Coagulate in 3 hours | Stable for 24 hours or more | Stable for 24 hours or more |
| Method for producing laminate | | | | | | | |
| Coagulation process | | Alcohol coagulating process | Alcohol coagulating process | Alcohol coagulating process | Heat-sensitive coagulation process | Alcohol coagulating process + salt coagulation | Alcohol coagulating process |
| Preheat temperature of fiber substrate | (° C.) | 67 | 67 | 67 | 67 | 67 | 67 |
| Surface temperature of fiber substrate immediately before dipping | (° C.) | 27 | 27 | 27 | 66 | 27 | 27 |
| Protective glove | | | | | | | |
| Total thickness of laminate | (mm) | 1.15 | 1.20 | 0.90 | 1.24 | 1.20 | 1.00 |
| Substrate layer average thickness d | (mm) | 0.70 | 0.70 | 0.70 | 0.70 | 0.70 | 0.70 |
| Total thickness of polymer layer | (mm) | 0.90 | 1.00 | 0.70 | 1.17 | 0.70 | 0.60 |
| Thickness $t_1$ of surface polymer layer | (mm) | 0.45 | 0.50 | 0.20 | 0.54 | 0.50 | 0.30 |
| Thickness $t_2$ of permeated polymer layer | (mm) | 0.45 | 0.50 | 0.50 | 0.63 | 0.20 | 0.30 |
| $t_2/t_1$ | | 1.00 | 1.00 | 2.50 | 1.17 | 0.40 | 1.00 |
| $t_1/d$ | | 0.64 | 0.71 | 0.29 | 0.77 | 0.71 | 0.43 |

TABLE 1-continued

|  |  | Example | | | Comparative Example | | |
| --- | --- | --- | --- | --- | --- | --- | --- |
|  |  | 1 | 2 | 3 | 1 | 2 | 3 |
|  |  | Evaluation | | | | | |
| Cracks in surface polymer layer |  | No | No | No | No | Yes | Yes |
| Peeling in surface polymer layer |  | No | No | No | No | No | No |
| Pass through |  | No | No | No | No | No | No |
| Comfort during wearing (degree of fatigue during wearing) |  | Good | Good | Good | Good | Poor | Poor |
| Flexibility |  | 3 | 3 | 3 | 3 | 1 | 1 |
|  |  | Wear resistance | | | | | |
| Number of rotations | (rpm) | 8,000 | 8,000 | 8,000 | 8,000 | 8,000 | 2,000 |
| LEVEL |  | LEVEL 4 | LEVEL 4 | LEVEL 4 | LEVEL 4 | LEVEL 4 | LEVEL 3 |
| Methanol permeation resistance |  | 4 | 4 | 3 | 4 | 3 | 3 |

As shown in Table 1, the coagulation was not observed in the latex composition for dip-molding (polymer latex) comprising the polysaccharide such as tamarind gum, and xanthan gum even it was stored for 24 hours or more, and the latex composition for dip-molding was excellent in the storage stability. In addition, the crack and peels were not observed in the surface polymer layer of the obtained laminate. Moreover, the obtained laminate was excellent in the comfort during wearing, the flexibility, the wear resistance and the methanol permeation resistance (the protection performance against a solvent) (Examples 1 to 3).

On the other hand, a coagulate was generated in the latex composition for dip-molding comprising the polyether-modified silicone oil as a heat-sensitive coagulant during storage, and the latex composition for dip-molding was inferior in the storage stability (Comparative Example 1).

In addition, even a compound classified into the polysaccharide, in the case of using the carboxymethyl cellulose, the crack was observed in the surface polymer layer of the obtained laminate. Moreover, the obtained laminate was inferior in the comfort during wearing and the flexibility (Comparative Examples 2 to 3).

The invention claimed is:

1. A laminate comprising a substrate and a polymer layer formed with a polymer latex, wherein the polymer latex comprises a polymer and at least one polysaccharide selected from the group consisting of tamarind gum, xanthan gum, cationized xanthan gum, gellan gum, guar gum, and cationized guar gum.

2. The laminate according to claim 1, wherein the polymer is nitrile rubber.

3. A method for producing the laminate according to claim 1, comprising:
    an alcohol depositing step of depositing alcohol on the substrate; and
    an alcohol coagulating step of contacting the substrate on which the alcohol is deposited to the polymer latex to coagulate the polymer thereby forming the polymer layer.

4. A method for producing the laminate according to claim 1, comprising:
    a heat-sensitive coagulating step of contacting the substrate in a heated state to the polymer latex to coagulate the polymer thereby forming the polymer layer.

* * * * *